US007003586B1

(12) United States Patent
Bailey et al.

(10) Patent No.: US 7,003,586 B1
(45) Date of Patent: *Feb. 21, 2006

(54) ARRANGEMENT FOR IMPLEMENTING KERNEL BYPASS FOR ACCESS BY USER MODE CONSUMER PROCESSES TO A CHANNEL ADAPTER BASED ON VIRTUAL ADDRESS MAPPING

(75) Inventors: Joseph A. Bailey, Austin, TX (US); Norman Hack, Pflugerville, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 718 days.

This patent is subject to a terminal disclaimer.

(21) Appl. No.: 10/083,390

(22) Filed: Feb. 27, 2002

(51) Int. Cl.
  *G06F 15/16* (2006.01)
  *G06F 12/10* (2006.01)
  *G06F 12/12* (2006.01)
(52) U.S. Cl. .................. 709/250; 711/163; 711/202; 711/203
(58) Field of Classification Search ............... 711/163, 711/203, 202; 709/250
See application file for complete search history.

(56) References Cited

U.S. PATENT DOCUMENTS

| 5,887,134 | A  | * | 3/1999 | Ebrahim ............... 709/200 |
| 6,223,270 | B1 | * | 4/2001 | Chesson et al. ......... 711/202 |
| 6,598,144 | B1 | * | 7/2003 | Bailey et al. ........... 711/203 |
| 6,760,787 | B1 | * | 7/2004 | Forin ..................... 710/18 |
| 2002/0144001 | A1 | * | 10/2002 | Collins et al. ......... 709/250 |
| 2002/0144078 | A1 | * | 10/2002 | Topham et al. ........ 711/203 |
| 2002/0178339 | A1 | * | 11/2002 | Beukema et al. ...... 711/203 |
| 2003/0018828 | A1 | * | 1/2003 | Craddock et al. ...... 709/321 |
| 2003/0079103 | A1 | * | 4/2003 | Morrow ................. 711/206 |
| 2003/0163647 | A1 | * | 8/2003 | Cameron et al. ....... 711/138 |
| 2004/0221127 | A1 | * | 11/2004 | Ang ....................... 711/203 |

OTHER PUBLICATIONS

Cassiday et al., "Hot Chips", *InfiniBand™ Architecture Tutorial*, Aug. 2000, pp. 1-79, InfiniBand™ Trade Association.
Hartmann, "Using The VIEO InfiniBand™ Channel Abstraction Layer (CAL)", *Channel Abstraction Layer (CAL)*, Jan. 2002, pp. 1-19, VIEO, Inc.

* cited by examiner

*Primary Examiner*—John Follansbee
*Assistant Examiner*—Joshua Joo
(74) *Attorney, Agent, or Firm*—Manelli Denison & Selter PLLC; Leon R. Turkevich

(57) ABSTRACT

A consumer resource provider is configured for generating a work request to a prescribed virtual destination address on behalf of a user-mode consumer process requiring a memory access. An operating system resource, configured for establishing communications between the consumer resource provider and a host channel adapter configured for servicing the work notifications, assigns virtual address space for use by the consumer resource provider, and respective unique mapping values specified as user mode access for use by the consumer resource provider in executing the memory accesses on behalf of the respective user-mode consumer processes. An address translator includes a translation map for uniquely mapping the virtual address space used by the consumer resource provider to a prescribed physical address space accessible by the host channel adapter. The address translator, in response to receiving the work notification at a virtual address from the consumer resource provider on behalf of an identified user-mode consumer process, maps the work notification to a corresponding prescribed physical address based on the corresponding mapping value assigned for the identified user-mode consumer process, enabling the host channel adapter to detect the work notification at the mapped physical address.

10 Claims, 5 Drawing Sheets

ARRANGEMENT FOR IMPLEMENTING KERNEL BYPASS FOR ACCESS BY USER MODE CONSUMER PROCESSES TO A CHANNEL ADAPTER BASED ON VIRTUAL ADDRESS MAPPING

BACKGROUND OF THE INVENTION

1. Field of the Invention

The present invention relates to interaction between a user mode (ring 3) process and a host channel adapter configured for communication with target channel adapters in an InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, availability, and serviceability.

In addition, processors used in servers have encountered substantial improvements, where the microprocessor speed and bandwidth have exceeded the capacity of the connected input/output (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between end nodes (e.g., central processing units, peripherals, etc.) and switches inside a server system. Hence, the term "InfiniBand™ network" refers to a private system area network (SAN) that connects end nodes and switches into a cluster within a server system, enabling the sharing of cluster resources. The InfiniBand™ Architecture Specification specifies both I/O operations and interprocessor communications (IPC).

A particular feature of the InfiniBand™ Architecture Specification is the proposed implementation in hardware of the transport layer services present in existing networking protocols, such as TCP/IP based protocols. The hardware-based implementation of transport layer services, referred to as a "channel adapter", provides the advantage of reducing processing requirements of the central processing unit (i.e., "offloading" processor code execution), hence offloading the operating system of the server system. Host channel adapters (HCAs) are implemented in processor-based nodes, and target channel adapters (TCAs) are implemented in peripheral-based nodes (e.g., network interface devices, mass storage devices, etc.).

However, arbitrary hardware implementations may result in substantially costly or relatively inefficient hardware designs. One example involves the servicing of work notifications, also referred to as "doorbells". Doorbells are generated by verbs consumer processes (e.g., operating system supplied agents) that post a work request (e.g., a work queue entry (WQE)) to a prescribed queue of an assigned queue pair in system memory; the verbs consumer process then sends the work notification to notify the host channel adapter (HCA) of the work request in system memory.

One concern in implementing the servicing of work notifications is the susceptibility of the HCA to unauthorized work notifications. In particular, the InfiniBand™ Architecture Specification specifies that the verbs consumer processes may be implemented as "ring 0" (kernel mode) or "ring 3" (user mode) processes: kernel mode have unrestricted access to any hardware resource accessible by the operating system. Hence, a concern exists that if a malicious or malfunctioning process improperly accesses an unauthorized address, for example a work notification address assigned to a second verbs consumer process, such improper access may cause the HCA to erroneously determine that the second verbs consumer process generated a work notification. Hence, the susceptibility of HCA to unauthorized work notifications by a malicious or malfunctioning process may cause a reliability concern that affects HCA operations. Moreover, concerns arise that such a malicious or malfunctioning process may further affect the reliability of the overall server system, for example compromising security routines normally utilized to prevent unauthorized transmission of private data (e.g., credit card information, etc.) across a public network such as the Internet.

In view of the foregoing, there is a concern about providing an efficient arrangement enabling user mode processes to access InfiniBand resources without compromising security. In particular, the InfiniBand™ Architecture Specification indicates that the Operating System (OS) can provide its clients with communication mechanisms that bypass the OS kernel and directly access HCA resources. Hence, there is a need to provide a user mode process with access to HCA resources using kernel bypass, because: (1) the InfiniBand™ Architecture Specification allows no more than 5 microseconds for any transitions to kernel mode, and (2) existing user mode to kernel mode transitions cannot be completed within the 5 microseconds limit specified by the InfiniBand™ Architecture Specification.

FIG. 1 is a diagram illustrating the kernel bypass concept proposed by the InfiniBand™ Architecture Specification. In particular, a computing node 10 includes user mode (ring 3) socket applications and verbs consumer processes 12 configured for performing user operations (e.g., file system calls) without any knowledge of the HCA 14. System calls by the socket application 12 are intercepted by a sockets or virtual interface provider library (VIPL) applications programming interface (API) 16. Conventional kernel mode transition using existing OS resources involves passing the system call to a TCP/IP sockets provider 18 operating according to a user/kernel boundary 20. The TCP/IP sockets provider 18 accesses a TCP/IP transport driver 22, which references a driver 24 that needs to transition to kernel mode before accessing the HCA 14.

The computing node 10 also includes a dynamically linked library (DLL) 26 operating as a ring 3 (user mode) process configured for accessing a SAN management or VIPL driver 27 (requiring kernel transition by the driver 24).

As illustrated in FIG. 1, it is contemplated that the DLL 26 is able to perform kernel bypass operations 28 in order to "ring the doorbell" for the HCA 14. However, to date there has been no disclosure or suggestion on how to implement the proposed kernel bypass operations 28. In particular, there is no disclosure or suggestion on how the SAN sockets/VIPL provider 26 can communicate with system memory 29 to deposit descriptors of work, and then ring the HCA doorbells, uniquely for each ring 3 process 12, without requiring the services of kernel mode software.

In addition, concerns exist about any proposed implementation for kernel bypass operations 28 that require a substantial amount of processing code to be added, reducing HCA performance throughput.

Page-based addressing has been used in processor architectures, for example the Intel-based x86 architectures, to reconcile differences between physical address space and virtual address space. For example, a personal computer capable of addressing 512 Mbytes may only have 128 Mbytes of installed memory; the operating system uses memory segments divided into discrete blocks, referred to as pages, that can be transferred between the physical memory and virtual memory allocated on a hard disk. Hence, the attempted execution of executable code that does not reside in physical memory results in generation of a page fault exception, causing the processor to swap unused pages in physical memory with the pages in virtual memory containing the required executable code. However, different processes still may access the same physical page of memory, since the operating system typically will provide processes a common mapping between the virtual page address and the physical memory address in I/O address space to enable the processes to access the same I/O device control registers of an I/O device within the I/O address space.

SUMMARY OF THE INVENTION

There is a need for an arrangement that enables a host channel adapter to be implemented in an efficient and economical manner.

There also is a need for an arrangement that enables a host channel adapter to service work notifications in a secure manner, without the risk of access to the host channel adapter via unauthorized addresses by unauthorized processes.

There also is a need for an arrangement that enables kernel bypass operations to be implemented, enabling user mode (i.e., ring 3) processes to access host channel adapter resources without the necessity of kernel mode resources.

There also is a need for an arrangement that enables implementation of kernel bypass operations with minimal executable code added to existing operating system software.

These and other needs are attained by the present invention, where a consumer resource provider is configured for generating a work request to a prescribed virtual destination address on behalf of a user-mode consumer process requiring a memory access. An operating system resource, configured for establishing communications between the consumer resource provider and a host channel adapter configured for servicing the work notifications, assigns virtual address space for use by the consumer resource provider, and respective unique mapping values specified as user mode access for use by the consumer resource provider in executing the memory accesses on behalf of the respective user-mode consumer processes. An address translator includes a translation map for uniquely mapping the virtual address space used by the consumer resource provider to a prescribed physical address space accessible by the host channel adapter. The address translator, in response to receiving the work notification at a virtual address from the consumer resource provider on behalf of an identified user-mode consumer process, maps the work notification to a corresponding prescribed physical address based on the corresponding mapping value assigned for the identified user-mode consumer process, enabling the host channel adapter to detect the work notification at the mapped physical address.

Hence, the host channel adapter can identify and service work requests based on the prescribed destination address for the user-mode consumer process, where the mapping of the virtual address to the prescribed physical address supplied by the operating system resource enables the consumer resource provider to access host channel adapter resources, without transitions into kernel mode.

One aspect of the present invention provides a method in a host computing system. The method includes assigning, by an operating system resource, a prescribed virtual address space and a corresponding mapping value specified as user mode access for use by a consumer resource provider for execution of a memory access on behalf of a user-mode consumer process. The method also includes loading a unique translation map entry having the corresponding mapping value for the user-mode consumer process into an address translator. The address translator is configured for controlling the memory access to a physical address space assigned for access to a host channel adapter. The method also includes outputting by the address translator a work notification, received from the consumer resource provider and specifying a prescribed virtual destination address within the prescribed virtual address space, to a corresponding mapped physical destination address within the mapped physical address space based on the unique translation map entry, the host channel adapter configured for detecting the work notification at the mapped physical destination address.

Another aspect of the present invention provides a host computing system comprising a consumer resource provider, a host channel adapter, an address translator, and an operating system resource. The consumer resource provider is configured for generating a work request to a prescribed virtual destination address on behalf of a user-mode consumer process requiring a memory access. The host channel adapter is configured for performing the work request by accessing a system area network, in response to detecting a work notification at a prescribed physical destination address. The address translator is configured for outputting the work notification, received from the consumer resource provider, to the host channel adapter at the prescribed physical destination address based on a unique translation map entry having a mapping value, specified as user mode access for use by the consumer resource provider, for mapping the prescribed virtual destination address for the corresponding user-mode consumer process to the corresponding physical destination address. The operating system resource is configured for assigning to the consumer resource provider a prescribed virtual address space including the prescribed virtual destination address, and the corresponding mapping value.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 2:
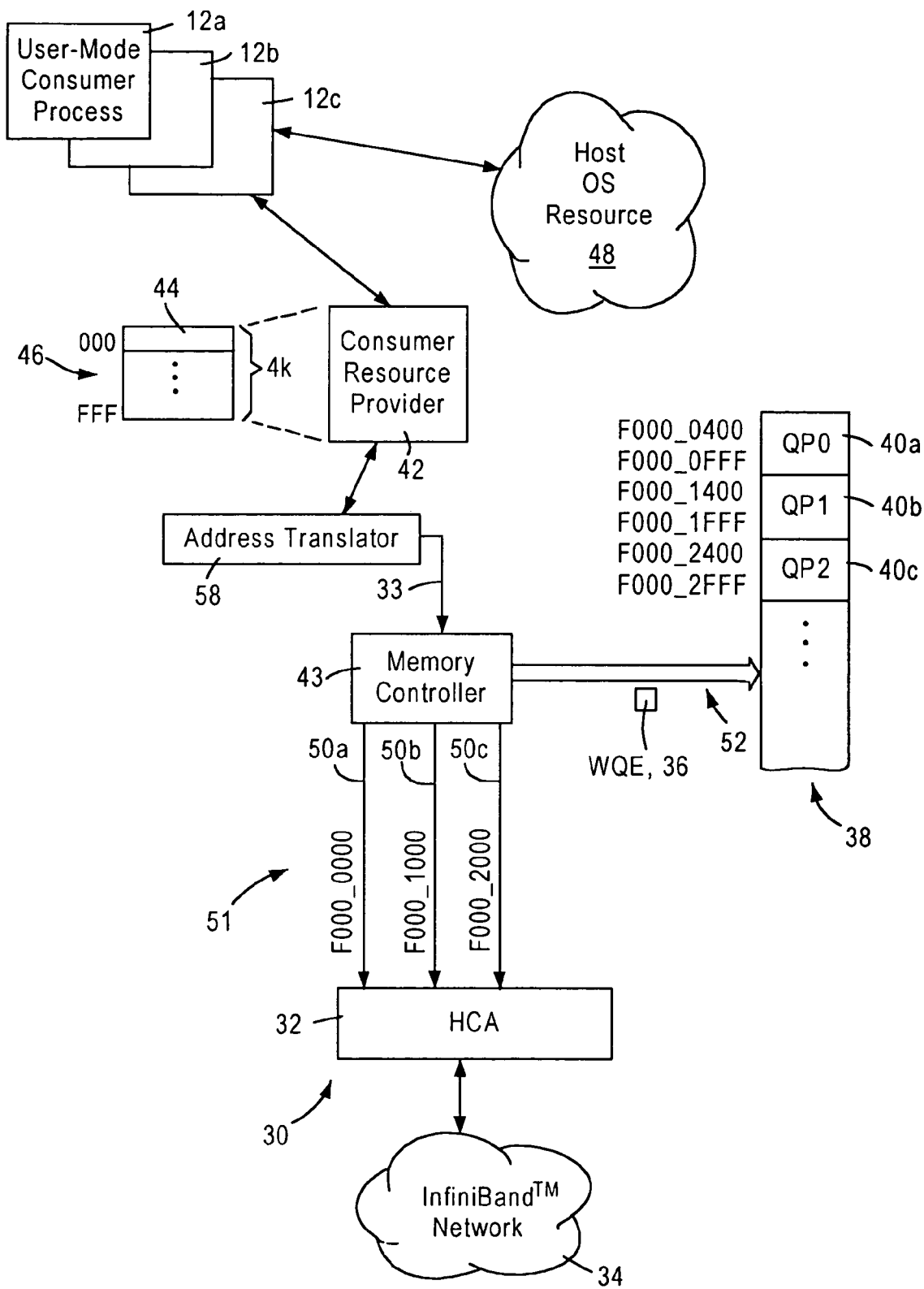
FIG. 2 is a diagram illustrating a host computing node configured for servicing work notification requests, using kernel bypass, according to an embodiment of the present invention.

FIG. 2 is a block diagram illustrating a host computing node 30 having a host channel adapter (HCA) 32 configured for generating and transmitting packets onto an InfiniBand™ network 34, according to an embodiment of the present invention. The HCA 32 is configured for sending and receiving data packets on the InfiniBand™ network 34 based on work queue entries (WQEs) (i.e., work descriptors) 36 stored in system memory 38. In particular, each user-mode (i.e., ring 3) consumer process 12 executed by a processor core is assigned a corresponding queue pair buffer 40 by a host OS resource 48, based on generation of a work request 36 by a consumer resource provider 42.

Figure 1:
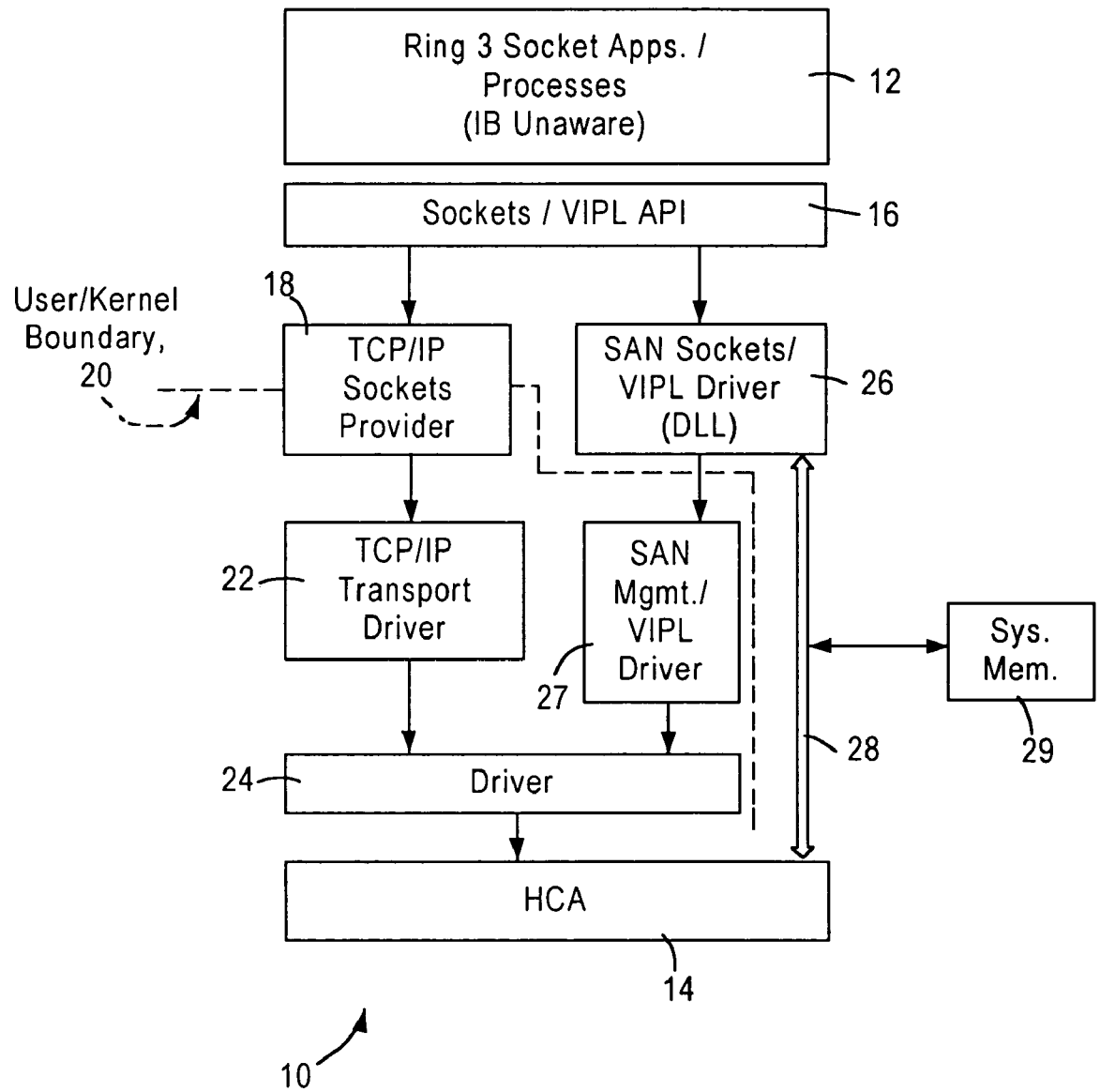
FIG. 1 is a diagram (prior art) illustrating a kernel bypass operation as specified by the InfiniBand™ Architecture Specification.

In particular, the user-mode consumer processes 12 perform general memory access operations, without any knowledge of the existence of the HCA 30 or the InfiniBand™ network 34. Each user-mode consumer process 12 performs the memory access operations based on issuing a procedure call to the consumer resource provider 42, implemented as a ring-3 dynamically linked library (DLL), similar to the SAN sockets/VIPL provider 26 of FIG. 1. The consumer resource provider 42 differs from the SAN sockets/VIPL provider 26 in that the consumer resource provider 42 is configured for generating the work request 36 to a prescribed virtual destination address 44 within a prescribed virtual address space 46 assigned by the operating system resource 48.

In particular, the consumer resource provider 42 is executed within the context of an identified one of the user-mode consumer processes 12 executed by the processor core; during execution of the user-mode consumer process 12 (e.g., 12a) by the processor core, the consumer resource provider 42 requests work to be performed by the HCA 32 on behalf of the user-mode consumer process 12 under execution. The work requested by the consumer resource provider 42 to be performed may be, for example sending data to a destination, a remote direct memory access (RDMA) read operation, or an RDMA write operation. The consumer resource provider 42 sends the associated work descriptor 36 to the queue pair buffer 40 assigned for that user-mode consumer process 12 by the host OS resource 48. For example, if the consumer resource provider 42 wishes to send data on behalf of the user-mode consumer process (e.g., 12a), the corresponding WQE 36 is sent to a corresponding send queue of the assigned queue pair buffer (e.g., 40a). If the consumer resource provider 42 wishes to perform an RDMA read operation on behalf of the user-mode consumer process (e.g., 12a), the corresponding WQE 36 is placed in the corresponding send queue of the queue pair (e.g., 40a). A separate RDMA read response structure is used to transfer into system memory the requested RDMA read response data supplied from the target/responder. The receive queue of the queue pair buffer 40 is used for inbound requests that target the corresponding process 12.

The consumer resource provider 42 notifies the HCA 32 of the work queue entry 36 added to the send queue of the queue pair buffer 40, on behalf of the user-mode consumer process 12 currently under execution by the processor core, by generating a work notification 50 for the corresponding work queue entry 36. Hence, the work notification 50, also referred to as a "doorbell", is used by the consumer resource provider 42 to notify the HCA 32 that there is work to be performed, specified by the work queue entry 36 stored in the queue pair buffer 40.

According to the disclosed embodiment, access to memory mapped resources is controlled by the operating system resource 48 in a manner that ensures that the consumer resource provider 42 accesses only the address space assigned by the host OS resource 48, based on the execution context relative to the user-mode consumer process 12 being serviced. Hence, the address space assigned to the user-mode consumer process 12a can only be accessed by the consumer resource provider 42 during execution on behalf of the user-mode consumer process 12a; in other words, the consumer resource provider 42 is prevented from accessing memory mapped I/O address regions 51 of the HCA 32 or system memory mapped address regions 52 of the system memory 24 that are not assigned to the current user-mode consumer process 12 being serviced. For example, the consumer resource provider 42 can only access (based on the virtual to physical translation) the memory space 40a or 50a during execution on behalf of the user-mode consumer process 12a (based on the scheduler 110); the consumer resource provider 42 can only access the memory space 40b or 50b during execution on behalf of the user-mode consumer process 12b; and the consumer resource provider 42 can only access the memory space 40c or 50c during execution on behalf of the user-mode consumer process 12c.

Figure 5:
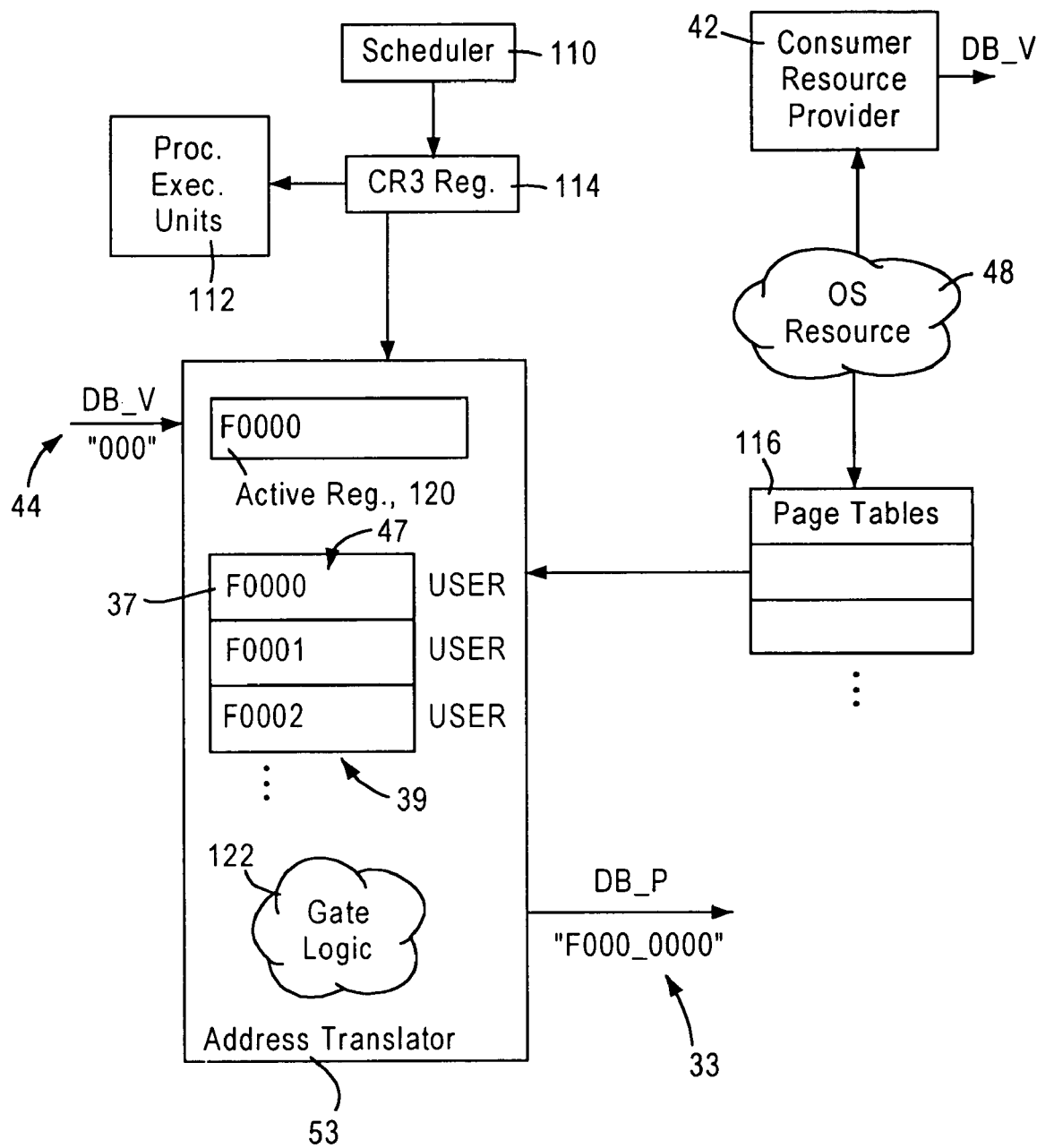
FIG. 5 is a diagram illustrating in further detail the address translator of FIG. 2.

The operating system resource 48 assigns a virtual address space 46 for use by the consumer resource provider 42; the virtual address space 46 is uniquely mapped by an address translator 53 to physical address space 33, including the memory mapped I/O address space 51 and system memory mapped address space 52, for each of the user-mode consumer processes 12 based on respective translation map entries 37 stored within a translation table, illustrated in FIG. 5 as translation table 39.

In particular, the virtual address space 46 is assigned by the operating system resource 48 as a contiguous range of addresses, selected as a page 46 having an addressable range, for example, of 4 kilobytes. Hence, the consumer resource provider 42 is assigned virtual address space 46 in the form of a 4 kilobyte page 46 addressable using 32 address bits. The consumer resource provider 42 accesses, on behalf of a corresponding verbs consumer process 12, the memory mapped I/O address regions 51 or the system memory mapped address regions 52 by executing a write to a virtual address 44. The address translator 53 maps the virtual address 44 to a physical address 33 based on retrieving the corresponding unique translation map entry 37 storing a corresponding unique mapping value 47 for the identified consumer process 12 currently being executed by the processor core, implemented for example as a physical address offset relative to other mapping values based on the prescribed size of the page 46. The mapping values 47 are established, for example, based on unique page tables and page directories established by the operating system resource 48 that uniquely map the virtual address 44. Each translation map entry 37 is identified as user-mode access for the consumer resource provider 42 according to execution context, described below.

The retrieved mapping value 47 is used to map the virtual address 44 to a physical address 33. The memory controller 43 is configured for distinguishing the physical address 33 as specifying either an I/O mapped address in I/O address space 51, or a system memory mapped address in system memory space 52, based on prescribed offsets relative to the HCA base address in the I/O address space 51. According to the disclosed embodiment, the virtual address "000" (hexadecimal) is used to map doorbells to the memory mapped I/O address region 51 and addresses up to a prescribed offset (e.g., 3FF hexadecimal) can used for other I/O accesses, whereas virtual addresses "400" to "FFF" are used to map memory access commands by the verbs consumer process 22 to the system memory mapped address region 52.

FIG. 5 is a block diagram illustrating in further detail the address translator 53. The address translator 53 is implemented as part of the processor core, and is configured for translating addresses 44 from the virtual address space 46 to the physical address space 33, based on identifying a process 12 under execution and based on the corresponding translation map entry 37 assigned to the identified process.

In particular, the processor core additionally includes a scheduler 110, processor execution units 112, and the address translator 53. The scheduler 110, implemented for example as a software based task scheduler configured for scheduling execution of processor code for a corresponding selected process 12, identifies for the processor execution units 112 and the address translator 53 the identified process 12 to be executed; for example, the identification by the scheduler 110 may be implemented in x86 based architectures by enabling the scheduler 110 to write the identifier for the identified process 12 to a "CR3" register 114, also referred to as the paging table directory control register.

The operating system resource 48 is configured for establishing for each verbs consumer process 12 the mapping value 47 in the form of a unique page table and directory entry 116 in system memory. Hence, the identifier in the CR3 register 114 serves as a pointer to the corresponding page table and directory entry 116 for use by the processor execution units 112 and the address translator 53 during execution of the scheduled process 12. This pointer specified by the CR3 register 114 establishes the execution context for the consumer resource provider 42, where the consumer resource provider 42 performs the necessary operations on behalf of the user-mode process 12 executed according to the CR3 register 114.

In response to the scheduler 110 reloading the CR3 register 114, the address translator 53 loads the mapping values 47 from the unique page table and directory entry 116 specified by the CR3 register 114 into an active register 120. As illustrated in FIG. 5, the mapping values 47 may be cached locally within the translation table 39. The address translator 53 includes gate logic 122 configured for generating a physical address ("DB_p") based on the virtual address 44 ("DB_v") and the mapping value 47 specified in the active register 120.

As an example, during execution by the processor execution units 112, the user-mode consumer process 12a requests a memory access; the consumer resource provider 42 issues a doorbell to the HCA 32 on behalf of the user-mode consumer process 12a by executing a write operation to the virtual address "000" (hexadecimal) (DB_v) 44. The address translator 53, having loaded the corresponding mapping value 47 (illustrated as a 20-bit physical destination address offset "F0000") into the active register 120, maps the 32-bit virtual address "000" "DB_v" 44 using the gate logic 122 to obtain a physical 32-bit memory address "DB_p" 33 having a value of "F000_000". The physical 32-bit memory address "DB_p" 33 having the value of "F000_0000" can then be identified by the memory controller 43 as a doorbell address 50a for the HCA 32 in the memory mapped I/O address space 51.

If the virtual address 44 is a value exceeding the prescribed offset, the memory controller 43 identifies the corresponding mapped physical 32-bit memory address 33 as a system memory mapped address 52 for accessing the corresponding queue pair buffer 24.

Hence, the assignment of unique translation map entries 37 for the consumer resource provider 42 on behalf of the respective user-mode consumer processes 12 ensures that the consumer resource provider 42 only accesses the prescribed queue pair buffer (e.g., QP0) 24 or doorbell (e.g., 50a) in context relative to the identified user-mode consumer process, via the address page 46 in virtual memory space 46.

Figure 3:
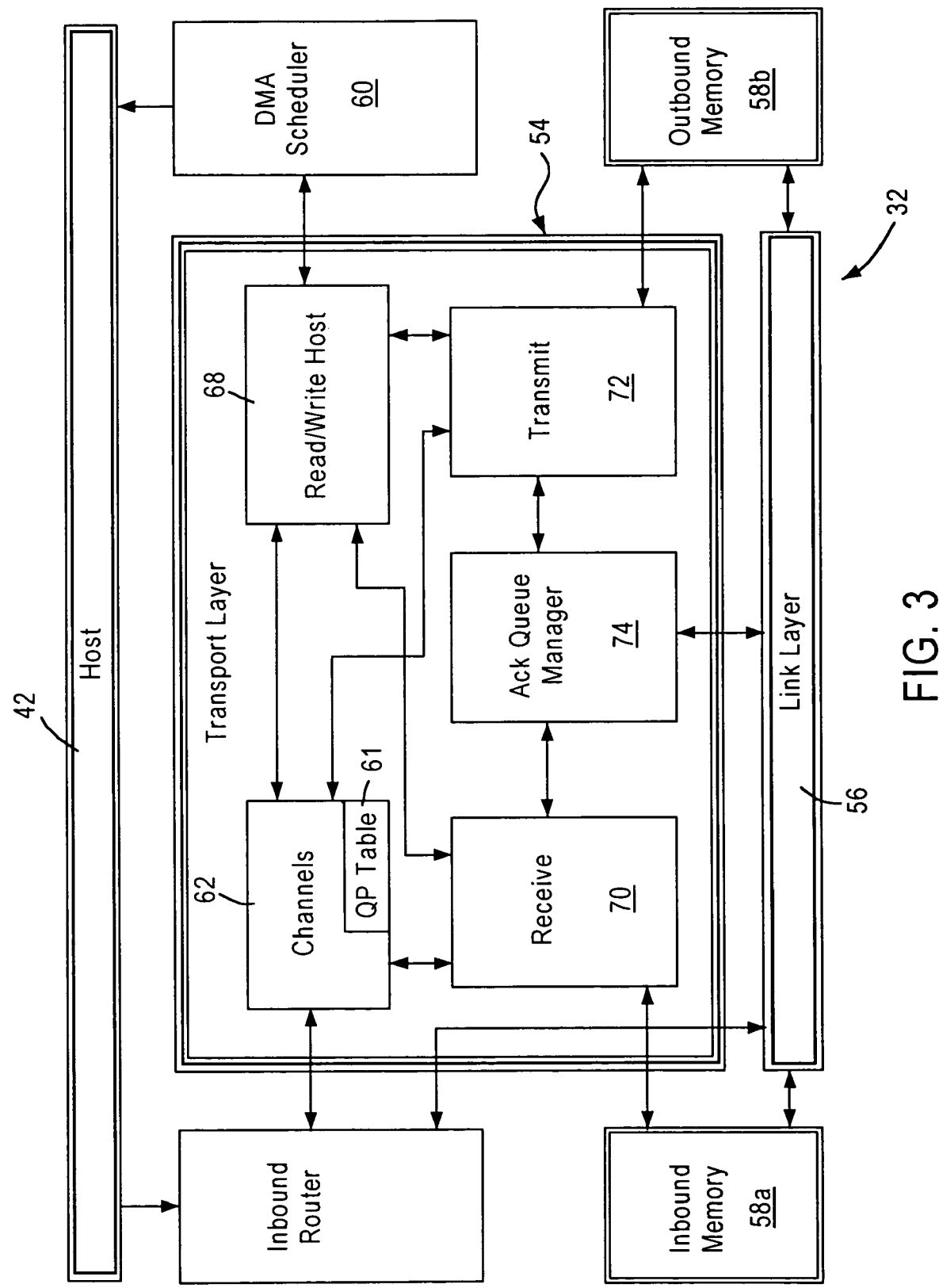
FIG. 3 is a diagram illustrating in detail the transport layer module of FIG. 2.

FIG. 3 is a block diagram illustrating in further detail the HCA 32 according to an embodiment of the present invention. The HCA 32 includes a transport layer 54, a link layer 56, memory buffers 58, and a DMA scheduler 60 configured for fetching the work descriptors 36 from the system memory 38.

The transport layer module 54 includes a channel module 62 having a queue pair attributes table 61. The transport layer module 54 also includes a read/write host manager 68 configured for managing read/write operations to and from the system memory 24 via the DMA scheduler 60, a receive service module 70, a transmit service module 72, and an acknowledgement queue manager 74.

The channels manager 62 is configured for managing transport services, including setup, management, and tear down of queue pairs, including storing a queue pair context entries that specify, for each corresponding queue pair 24, the necessary queue pair attributes including a corresponding notification address 50. In particular, the queue pair table 61 includes the mapping value 47, enabling the HCA 32 to identify the user-mode consumer process 12 associated with the work notification 50 generated by the consumer resource provider 42, based on the physical destination address relative to the offset, based on the page size and the zero-offset address location.

The receive service module 70 is configured for determining whether a receive message includes application based data for a user-mode consumer process 12, transport service information for the charnel manager 62, or an acknowledgment for the acknowledgment queue manager 74.

The transmit service module 72 is configured for generating the appropriate transport layer headers for the retrieved WQEs 36 based on the associated queue pair attributes. The transmit service module 72 also manages transmission of acknowledgments according to connection based requirements (e.g., reliable connection, reliable datagram) specified by the acknowledgment queue manager 74.

The memory buffers 58a and 58b are used for storing receive data and transmit data, respectively.

Figure 4:
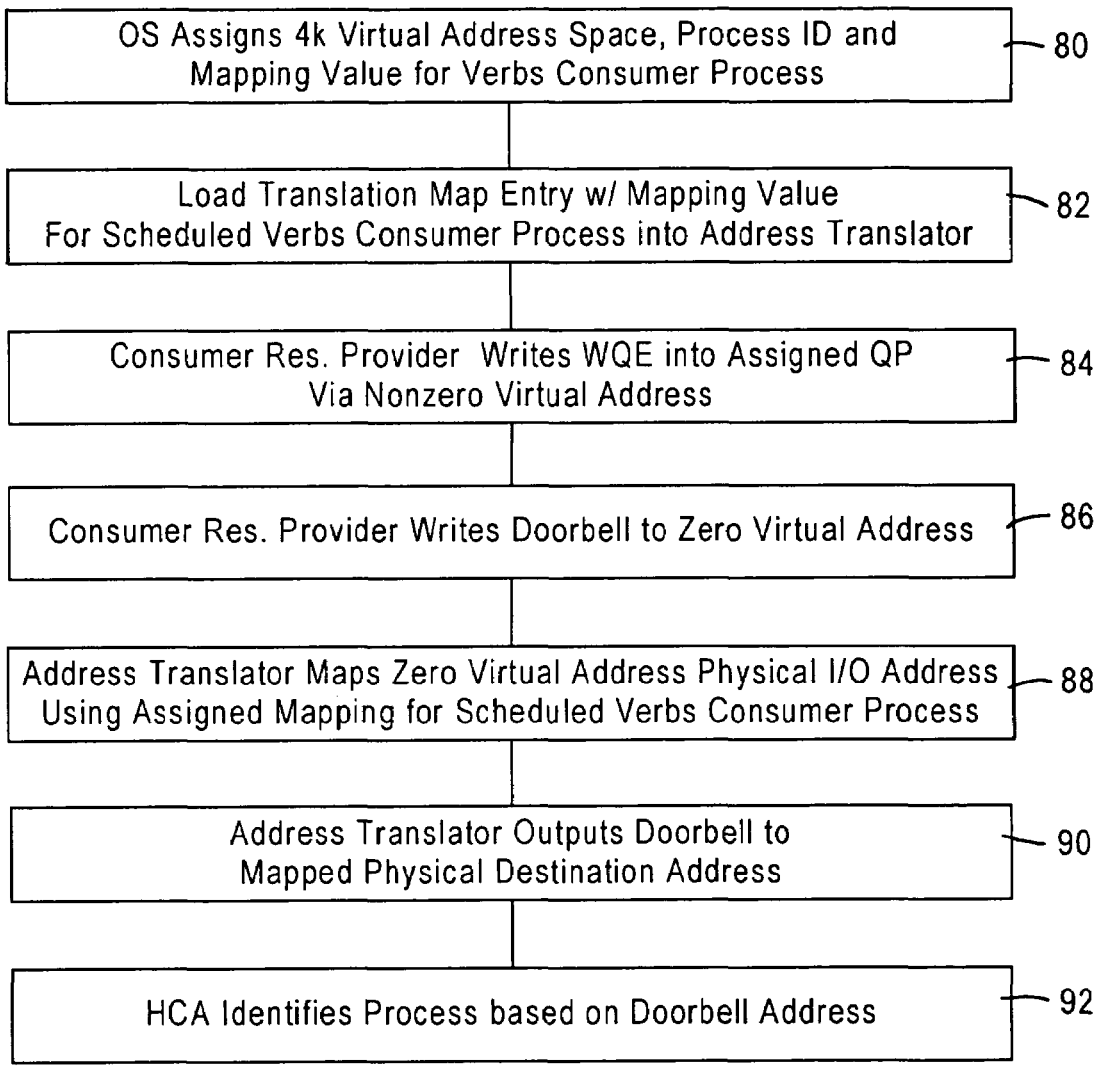
FIG. 4 is a diagram illustrating the method by the host channel adapter of FIG. 2 of servicing a work notification written to a destination address based on the destination address, according to an embodiment of the present invention.

FIG. 4 is a flow diagram illustrating the method of managing access by the consumer resource provider 42 on behalf of the user-mode consumer processes 12, according to an embodiment of the present invention. The method begins in step 80, where the operating system resource 48 registers a newly instantiated user-mode consumer process 12 by assigning to the user-mode consumer process 12 the prescribed virtual address space 46 in the form of a 4 kilobyte address page 46. The operating system resource 48 also assigns in step 80 an identifier for use by the scheduler 110 in scheduling execution of the user-mode consumer process, and a unique mapping value 47, illustrated in FIG. 5 as a new page table and directory entry 116 that specifies a user mode access. The operating system resource 48 repeats step 80 as each user-mode consumer process instance is instantiated.

Once the user-mode consumer process 12 has been registered by the operating system resource 48, the consumer resource provider 42 can begin generating work requests 36 on behalf of the user-mode consumer processes 12 requesting memory accesses without any knowledge of the HCA 30. The address translator 53 loads in step 82 a unique translation map entry 37 for the user-mode consumer process 12, as the user-mode consumer process 12 is scheduled for execution, enabling the address translator 53 to map any virtual address specified by the consumer resource provider 42 on behalf of the identified process 12 to a unique physical address.

The consumer resource provider 42 writes in step 84 a work queue entry 36 to the assigned queue pair buffer 40 by writing the work queue entry 36 in virtual address space 46 to a virtual address having a prescribed address offset relative to the HCA base address. The address translator 53 maps the virtual address to the system memory mapped address space 52 for access to the assigned queue pair buffer 40, based on the corresponding translation map entry 37.

The consumer resource provider 42 then outputs in step 86 a work notification by executing a write operation to the prescribed virtual destination address "DB_v" of "000" 44 for work notifications. The address translator 53 maps in step 88 the prescribed virtual destination address to the physical address space 32 assigned for access to the host channel adapter 32 based on mapping the prescribed virtual destination address 44 to the prescribed physical destination address 50. The address translator 53 outputs in step 90 the doorbell by writing to the mapped physical destination address 50, identified by the HCA 32 in step 92 as a doorbell for the corresponding process 12.

According to the disclosed embodiment, user-mode consumer processes are assigned a virtual address space for memory access by a consumer resource provider, on behalf of the user-mode consumer processes, where the virtual address space is mapped by a address translator using unique translation map entries based on the execution context of the consumer resource provider relative to an identified one of the processes. Hence, the user-mode consumer processes can utilize a consumer resource provider for kernel bypass operations based on translations of virtual address space to physical address space based on user mode translations.

Although the disclosed embodiment describes a page having an addressable range of 4 kilobytes, the addressable range selected may be of different sizes, for example 4 megabytes. Moreover, the assignment of a single page to each process is by way of illustration only: each process may be assigned multiple pages, where the corresponding translation map entry stores respective mapping values for the multiple pages. Further, the assignment of virtual addresses is at the discretion of the host OS resource, and implemented by writing the appropriate mapping values into the corresponding translation map entry.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a host computing system, the method comprising:

assigning, by an operating system resource, a prescribed virtual address space and a corresponding mapping value specified as user mode access for use by a consumer resource provider for execution of a memory access on behalf of a user-mode consumer process;

loading a unique translation map entry having the corresponding mapping value for the user-mode consumer process into an address translator, the address translator configured for controlling the memory access to a physical address space assigned for access to a host channel adapter; and outputting by the address translator a work notification, received from the consumer resource provider and specifying a prescribed virtual destination address within the prescribed virtual address space, to a corresponding mapped physical destination address within the mapped physical address space based on the unique translation map entry, the host channel adapter configured for detecting the work notification at the mapped physical destination address.

2. The method of claim 1, wherein:

the loading step includes loading, into the address translator, respective unique translation map entries having the respective mapping values specifying respective physical address space offset values for respective user-mode consumer processes; and the outputting step includes:

(1) receiving from the consumer resource provider, executed in context relative to an identified one of the user-mode consumer processes, the work notification specifying the prescribed virtual destination address, and (2) outputting the work notification to the corresponding mapped physical destination address based on the corresponding unique translation map entry.

3. The method of claim 2, wherein the assigning step includes assigning as the prescribed virtual address space a contiguous range of addresses, the contiguous range having a prescribed size.

4. The method of claim 3, wherein the assigning step includes selecting the contiguous range of address as a four kilobyte address range.

5. The method of claim 3, further comprising identifying, by the host channel adapter, the user-mode consumer process requiring the memory access on the corresponding mapped physical destination address of the work notification relative to an offset determined based on the prescribed size and a zero-offset address location.

6. A host computing system comprising:

a consumer resource provider configured for generating a work request to a prescribed virtual destination address on behalf of a user-mode consumer process requiring a memory access;

a host channel adapter configured for performing the work request by accessing a system area network, in response to detecting a work notification at a prescribed physical destination address;

an address translator configured for outputting the work notification, received from the consumer resource provider, to the host channel adapter at the prescribed physical destination address based on a unique translation map entry having a mapping value, specified as user mode access for use by the consumer resource provider, for mapping the prescribed virtual destination address for the corresponding user-mode consumer process to the corresponding physical destination address; and an operating system resource configured for assigning to the consumer resource provider a prescribed virtual address space including the prescribed virtual destination address, and the corresponding mapping value.

7. The computing system of claim 6, wherein the operating system resource is configured for assigning for multiple respective user-mode consumer processes respective mapping values and the prescribed virtual address space including the prescribed virtual destination address, the operating system resource configured for loading respective unique translation map entries including the respective mapping values into a memory accessible by the address translator.

8. The computing system of claim 7, wherein the operating system resource assigns to the prescribed virtual address space a contiguous range of addresses, the contiguous range having a prescribed size.

9. The computing system of claim 7, wherein the operating system resource is configured for assigning each mapping value based on a corresponding physical address space offset based on the prescribed size.

10. The computing system of claim 7, wherein the host channel adapter is configured for identifying the user-mode consumer process requiring the memory access based on the corresponding mapped physical destination address relative to an offset determined based on the prescribed size and a zero-offset address location, the consumer resource provider outputting the work request during execution thereof in context relative to an identified one of the user-mode consumer processes.

* * * * *